United States Patent [19]

Toporek

[11] 4,364,514
[45] Dec. 21, 1982

[54] HEAT-RECOVERING APPARATUS FOR FURNACES

[76] Inventor: John R. Toporek, 13160 Rhode St., Cedar Lake, Ind. 46303

[21] Appl. No.: 153,160

[22] Filed: Jul. 1, 1980

Related U.S. Application Data

[63] Continuation-in-part of Ser. No. 954,551, Oct. 25, 1978, abandoned.

[51] Int. Cl.³ .............................................. F24B 7/00
[52] U.S. Cl. ..................................... 237/55; 165/154; 165/DIG. 2; 126/112
[58] Field of Search ...................... 237/55, 54, 51, 53; 126/101, 112; 165/DIG. 2, 154

[56] References Cited

U.S. PATENT DOCUMENTS

| | | | |
|---|---|---|---|
| 921,019 | 5/1909 | Speer | 237/54 |
| 1,573,406 | 2/1926 | Lewis | 237/55 X |
| 1,903,387 | 4/1933 | Howe | 165/154 |
| 2,362,985 | 11/1944 | Brown | 165/154 |

Primary Examiner—Albert J. Makay
Assistant Examiner—Henry Bennett

[57] ABSTRACT

An attachment for a building furnace which contains a combustion unit inside of an air plenum. The attachment is inserted as a replacement section of the smoke flue. The jacketed chamber acts as a heat exchanger, preheating incoming combustion air. The outer end lower portion of the jacketing chamber receives a fresh air duct from the outside of the building. A duct from the outer end upper portion of the heat exchange chamber leads into the lower portion of the combustion unit plenum at the burners. Attached to the smoke flue, and between it and the outer portion of the chamber, are longitudinally-oriented channeled elements for transferring sensible heat. A return duct from the heated living area leads into the furnace, terminating at the inlet of a blower in the bottom of the furnace. The outlet of the blower is upward into the space surrounding the combustion unit. Such space also joins above the latter to lead upwardly into the heated living area.

1 Claim, 3 Drawing Figures

HEAT-RECOVERING APPARATUS FOR FURNACES

This applicaion is a continuation-in-part of Ser. No. 954,551, filed Oct. 25, 1978, abandoned.

This invention relates to furnaces in homes, apartment buildings and the like. The effect thereof of the temperature of the premises is to increase the same at a given energy input level. It is known that the burners of a furnace consume a considerable amount of air from within the premises. Outside air therefore enters the same through cracks and crevices with a cooling effect on the room temperature. Also, a considerable amount of heat is wasted by the passage of hot gases (products of combustion) through the smoke flue on the way to the chimney. It is therefore one object of the present invention to provide heat to the combustion air (fresh air) entering the furnace from the outside. This creates a flow of such air at a warmer than ambient temperature to enter the combustion unit, reducing the operating time of the burners of said unit, and reducing energy consumption for a given heat output.

The principal object of the invention is to provide means for capturing a portion of the heat passing through the smoke flue of the furnace. This is accomplished by building a jacketing chamber around a portion of smoke flue and using it as a heat exchanger to cause cold air from the outside of the premises to serve as a warm air supply for the furnace burners, thus improving the thermal efficiency of the same.

Another object is to employ an angularly-bent one-piece element installed completely through the smoke flue portion of the exchanger and a radial array of channeled and straight fins in the jacketing chamber. These fins are mounted on the inner pipe portion of the replacement section of smoke flue but do not touch the outer portion of the exchanger. They extend longitudinally from the end of the chimney side of the jacketing chamber to just short of the end of the furnace side of the jacketing chamber, and are used as heat conductors to provide maximum area for the heat transfer action just mentioned. The length, tightness and arrangement of the fins are critical to the invention as they form a split chamber which will be shown.

Another further object is to provide an apparatus for the above purpose which is applicable to or connected with the furnace by simple and inexpensive means.

Another object is to provide a heat recovery apparatus that is safe and will not accidently allow combusiton gases to enter the living area.

A final object is to economically construct an apparatus of the character described which will add to the thermal efficiency of the furnace.

A better understanding of the invention may be gained by reference to the accompanying drawing, in which.

Figure 1:
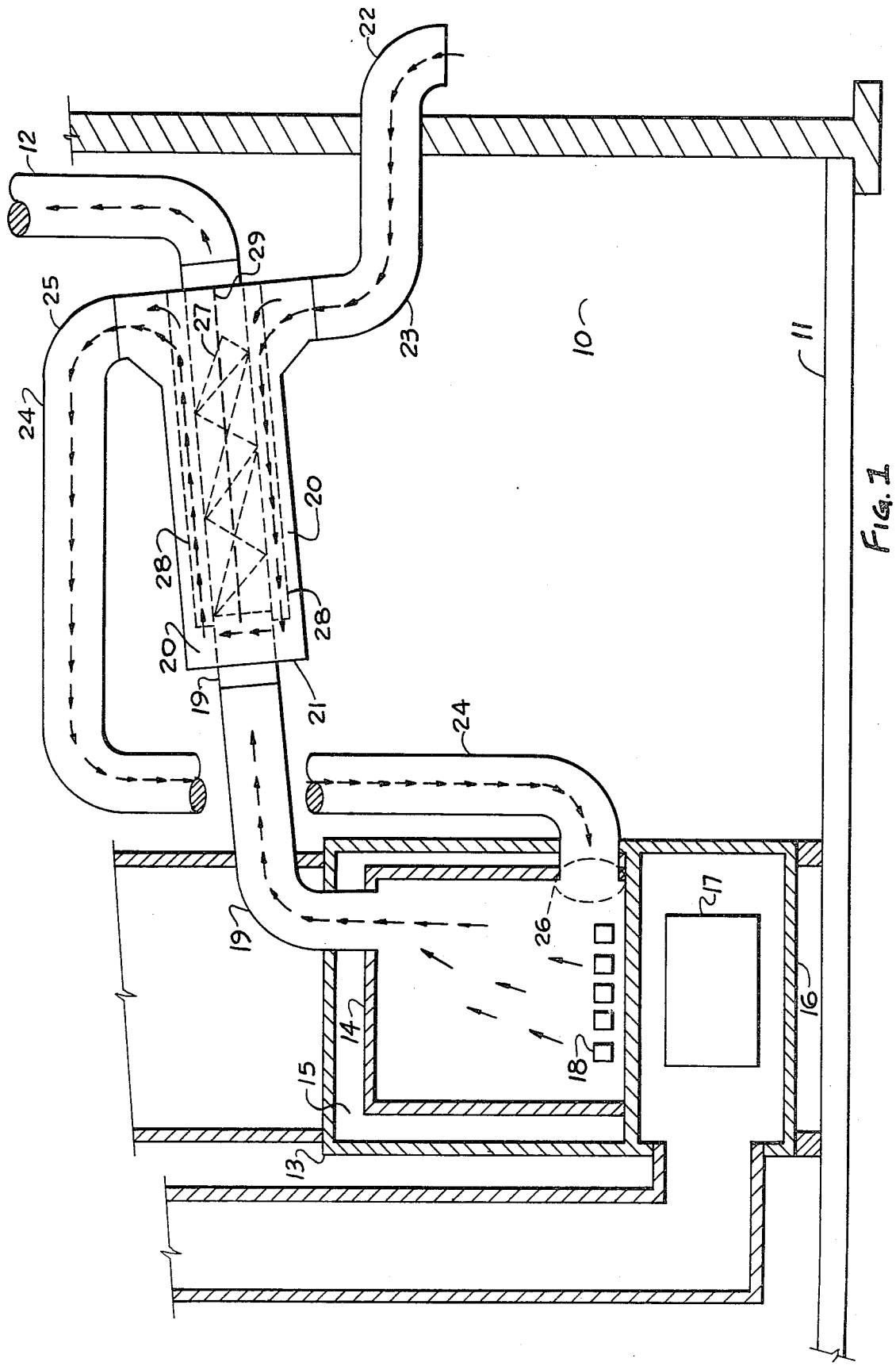
FIG. 1 is a general view of the improved apparatus as installed, partly in section.

Referring specifically to the drawing, 10 denotes a typical building with a base 11 and a chimney 12.

A furnace 13 is installed in a suitable manner over the floor 11 and contains a combustion unit 14 around which there is an air-filled plenum 15. These items are shown in general, with details omitted.

The furnace 13 has a base 16 on which a properly installed blower 17 is mounted and designed to draw returned air from the lefthand side and blow in an upward direction into the building. The combustion unit has burner elements 18 at the bottom. Near the top a smoke flue 19 exits from the combustion chamber through the plenum of the furnace to connect with the lower part of the chimney 12 as shown at the extreme right in FIG. 1.

The principal part of the invention is a jacketing chamber 20 which surrounds a replacement section of smoke flue 19 and has a closure 21 at one end. An outside-air duct 22 enters the building from one side swith a curve 23, joining with the outer end lower portion of the jacketing chamber 20. A similar duct 24 leaves the outer end upper portion of the jacketing chamber with a curve 25 to extend into the lower portion of the combustion unit of the furnace. The duct 24 enters the lower portion of the combusition unit, as indicated by dotted lines at 26.

Figure 3:
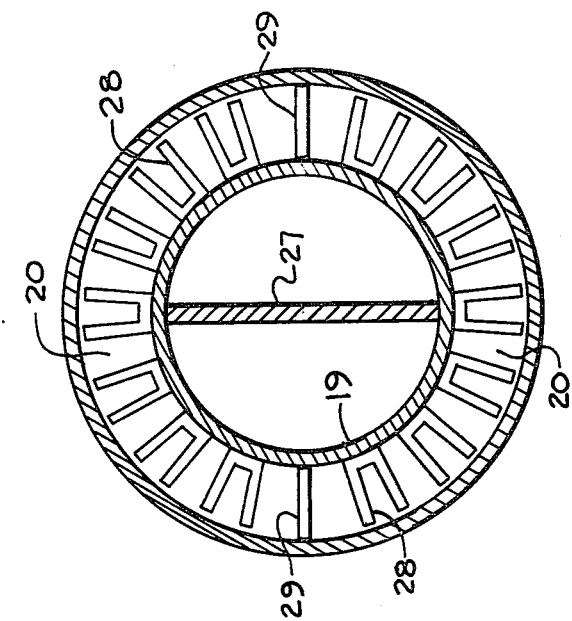
FIG. 3 is a further-enlarged section on the line 3—3 of FIG. 2.

It will now be apparent that the products of combustion passing outwardly from the combustion unit through the smoke flue replacement section 19 will cause the inward flowing combustion air in the jacketing chamber to become heated from contact with the walls of the replacement section of the smoke flue. An angularly bent element 27 is installed in the smoke flue portion of the exchanger to effect turbulence and thus bring products of combustion into more intimate contact with the walls of the replacement section of the smoke flue. Thus heat is transferred to the air being drawn through the jacketing chamber. Also, a radial array of channeled and straight fins 28 extends longitudinally from the chimney side (outer) end, to just short of the furnace side (inner) end of the exchanger within the jacketing chamber of the replacement section of smoke flue. While these may be singly attached, it is preferable to make pairs of them in channel form as shown in FIG. 3 in order to reduce the number of parts involved and increase the effective heat transfer area. The fins will absorb heat from the combustion gases inside of the smoke flue and transfer it to the air passing through the jacketing chamber, preheating it for use in the combustion unit.

Figure 2:
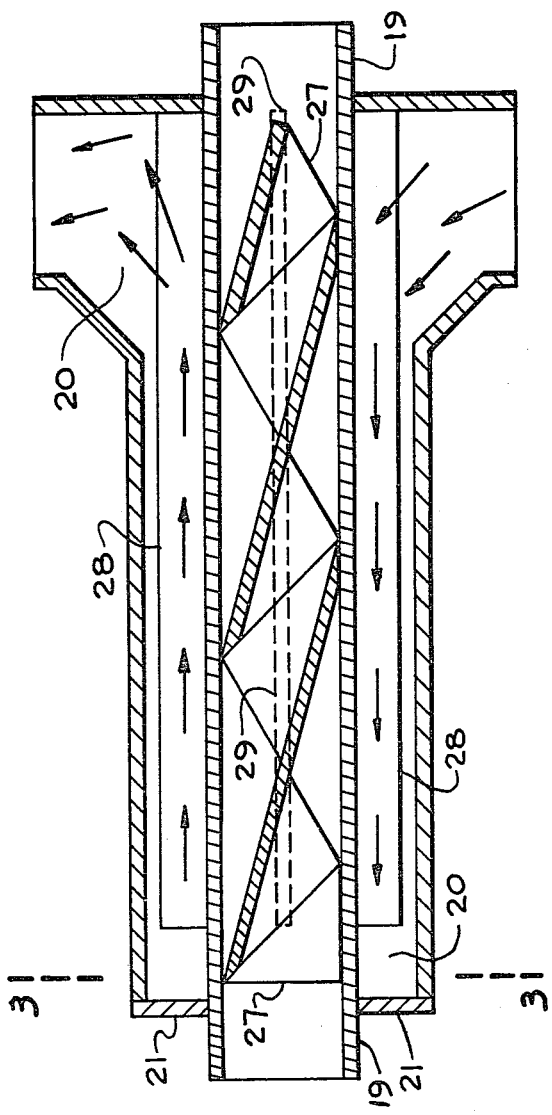
FIG. 2 is a magnified section, partly broken away, showing the construction of the smoke flue jacketing chamber, its flow pattern and the heat transfer elements just mentioned.

An enlarged fin 29, is installed longitudinally on each side of the smoke flue, but is attached to the inner portion of the jacketing chamber's outer wall, so that when the replacement piece of finned smoke flue is installed in the jacketing chamber, these enlarged fins will direct outside air longitudinally down the bottom half of the exchanger and back up the upper half leading to the furnace combustion unit, as shown in FIG. 2, preventing natural vertical rise of heated air and increasing exit air temperature. This chamber splitting is done to increase heat transfer to the incoming air.

It is now evident that the jacketed smoke flue becomes a source of increased heat, increasing the thermal efficiency of the furnace combustion unit by means of heat transfer through the smoke flue to the atmosphere and combustion gases will transfer a considerable portion of their sensible heat back to the combustion unit. The warmed air directed as mentioned has the most efficient air flow pattern and will thus fill the combustion unit with preheated air needed for the burners, thus reducing operating time of said burners. Elimination of drafts from joints and crevices into the building by means of the combustion unit using its own outside air supply through the said smoke flue replacement section (heat exchanger) will thus improve the thermal efficiency of the furnace as stated and will enable it to use less fuel.

It is intended at this point to mention that all vents on the furnace leading to, and supplying the combustion unit with the internal air be blocked off and sealed in order that said unit's only air supply be through the heat exchanger's fresh air duct 22.

I claim:

1. In a hot air furnace for a dwelling unit a flue gas heat exchange device located within an exhaust gas discharge flue wherein said heat exchange device preheats combustion air that is directed to the combustion chamber of the hot air furnace wherein the improvement comprises:

a flue gas heat exchanger that comprises an extended inner duct that conveys the exhaust flue gases in heat exchange relationship with a jacketing chamber surrounding the inner duct, said inner duct having a one piece angular bent deflector strip that extends the length of the inner duct to retard the flow of exhaust flue gases and to enhance the heat exchange between the flue gases within the inner duct and the jacketing chamber, said jacketing chamber defined by a wall extending around the inner duct and having an air inlet and air outlet at a common end of the jacketing chamber, said air inlet is in communication with exterior air through a connecting duct that terminates on the under side of the jacketing chamber, said air discharge is in communication with the hot air furnace combustion chamber through a connecting duct that terminates on the top of the jacketing chamber above said jacketing chamber air inlet, within said jacketing chamber extending from the inner duct are pairs of radially mounted fins that extend longitudinally from the common end of the jacketing chamber but not touching the opposite end of the jacketing chamber, said jacketing chamber further containing two splitter fins that extend between the outer wall of the inner duct and the inner wall of the wall spaced from the outer wall of the inner duct to define an upper and lower jacketing chambers at the common end of the jacketed chamber, said splitter fins extending longitudinally within the jacketing chamber of the same length as said pairs of fins, said splitter fins defining an air flow path within the jacketing chamber where inlet air is directed to the lower jacketing chamber inlet, longitudinally down the lower jacketing chamber, up to the upper jacketing chamber longitudinally down the upper jacketing chamber and out the jacketing chamber air outlet.

* * * * *